Sept. 25, 1928.
H. ADAMS
APPARATUS FOR MAKING COLLOIDAL FUEL
Filed March 13, 1925
1,685,115
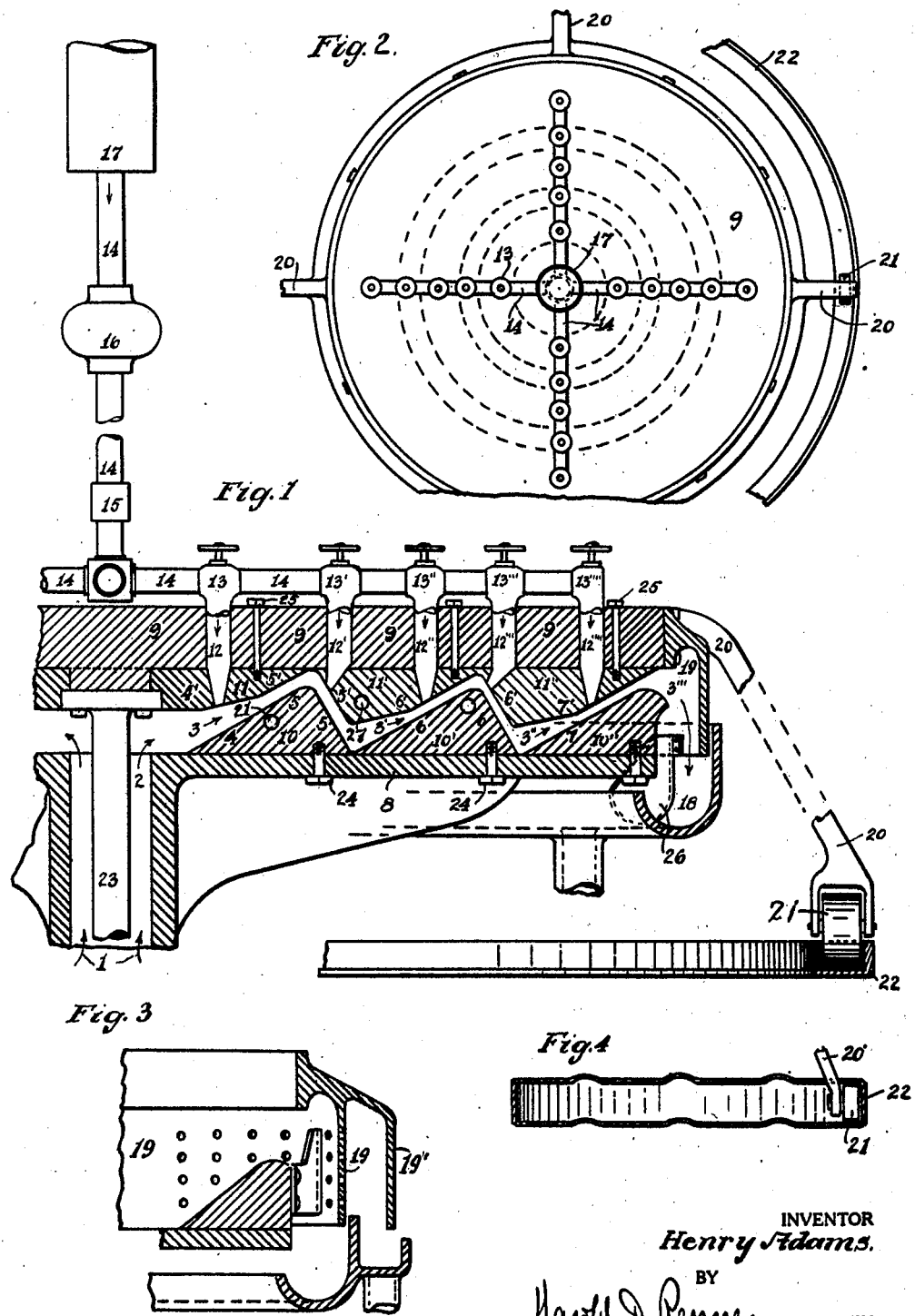
INVENTOR
Henry Adams.
BY
Harold D. Penney ATTORNEY Patented Sept. 25, 1928.

1,685,115

UNITED STATES PATENT OFFICE.

HENRY ADAMS, OF PLAINFIELD, NEW JERSEY.

APPARATUS FOR MAKING COLLOIDAL FUEL.

Application filed March 13, 1925. Serial No. 15,251.

This invention relates to a new and improved process of preparing fuel in a colloidal form; that is a fuel made up of pulverized carbonaceous substance and liquid hydrocarbons which are so combined and treated as to form a stable atomizable fuel.

Some of the kinds of solid fuels susceptible to reduction by pulverization, or otherwise, and suitable for combining with liquid hydrocarbon, to create colloidal fuel are the anthracite coals, the bituminous coals, the lignites; the culm, dust, screenings, slush and seam dirt of such coals; coke; breeze; charcoal; hard pitch; and peat; and many other carbonaceous substances of high ash and sulfur content.

One object of this invention is to properly combine the carbonaceous substance and the liquid hydrocarbon in a thoroughly homogeneous manner, by mixing these and stabilizing them during the process of pulverizing the carbonaceous substance to the desired fineness required for the colloidal fuel.

Another object of this invention is to completely cover and coat each particle of the pulverized carbonaceous substance with a film of the liquid hydrocarbon.

As one of the important items in preparing colloidal fuel is the diffusion of the solid particles through the liquid, this complete coating of every particle is especially important in reference to the stability of the fuel, and if the components are properly mixed and treated it is not necessary to reduce the solids to such fine particles. For example, I have found that fifty five percent by weight of the foreign substances divided between the liquid and solid constituents derived from coal can be stabilized in mineral oil, and a good colloidal fuel would be made up of: 60% fixated mineral oil, 10% coal tar, and 30% coal.

Still another object of this invention is to obtain stability in colloidal fuels by means of proper treatment and mixing of the solids and liquid hydrocarbons, and if required of the fixture therefor. Three ways may be used to obtain this stability;

1. By the use of certain stabilizing substances of which, for example, the following is a typical formula (proportions by weight); 83.5% oil, 10% rosin, 5% slaked lime, 1.5% water.

2. By heat treatment below flash points which will peptize certain coals and other carbonaceous substances to which coal distillates are added.

3. By extremely fine pulverization, coal can be reduced to a colloidal size, and the necessary stability obtained by the increase in surface tension resulting from the intimate division of the coal particles.

It is known that certain carbonaceous substances conchoidal in fracture and crystalloidal such as coal, are peptizable, particularly bituminous coals and the lignites, and when peptized become spongy and caviated, reducing by adsorption apparent specific gravity when suspended in a liquid, thus partially correcting the tendency of such solid to settle out of the liquid or if in a pasty form the tendency of the liquid to exude is much reduced; furthermore while the peptizing agent is used to peptize the particles, it also has a dissolving and consequent stabilizing effect, in some instances. Also in two or more liquid hydrocarbons, either miscible or partially so, stability can be readily obtained if properly treated and mixed by this process.

With a fixated mineral oil agent, generally speaking, the lower the temperature the fewer the particles of solid introduced and the smaller the size of the particles the less agent need be employed. If a pasty fuel is to be produced less agent is used than for a liquid fuel; also the amount of agent used is dependent on the stability required. Mobile pastes may be made carrying as high as 75% of solid particles; mobile gels are made from liquids or paste, and colloidal fuels may be a combination of both of these forms. A number of liquid fuels may be prepared in these forms between these approximate ranges.

For our example, we will take a colloidal fuel made up of coal. The two important steps to produce a colloidal fuel are as follows:

1. The pulverizing of the solids,
2. The intimate and homogeneous mixing with liquid hydrocarbons, and the fixing agent if required.

When coal, especially the anthracite variety, is pulverized to pass through a given mesh of screens a great many particles are produced which are smaller than those which will just pass the given mesh. For example, if coal be pulverized so that approximately 99% will pass through a 100 mesh screen; 98% will be found to pass a 200 mesh; 85% will pass a 300 mesh and 70% will pass a 400 mesh; (these figures are quoted from well known authorities on the pulverizing of coal).

One of the objects of this invention is to prepare a colloidal fuel in which the liquid hydrocarbon used will be intimately mixed with the coal as it is being, and immediately thereafter, reduced, thereby covering each of the smaller as well as the larger particles of the coal with a film of the hydrocarbon as well as with the fixing agent required, and as the larger particles are further reduced they immediately receive additional liquid hydrocarbon which will cover the fresh fractures completely surrounding the reduced particles with a similar film.

In carrying out this process I employ an apparatus which is an improvement on my United States Patent No. 1,221,952, dated April 10, 1917, but I do not limit myself to this particular structure nor even to the preparation of colloidal fuels nor in some respects to the reduction of carboniferous substances or their mixture with liquid hydrocarbons as it is obvious that the same process may be used for preparing other forms of colloidal matter. As an example, non-mixable liquids may be introduced through the passage indicated by arrows 1—2—3 and the orifices 12—12' etc. for quickly and thoroughly combining them in a stable colloidal condition.

In the accompanying drawing, showing by way of example, one of many possible embodiments of the invention, Fig. 1 is a fragmental side view in section of the apparatus.

Fig. 2 is a plan view.

Fig. 3 is an enlarged fragmental view of the rim showing a supplemental foraminous rim.

Fig. 4 is an enlarged fragmental view of the guiding track. Alternate enclosed type to cause oscillation of the table.

The same ordinal is used in all views to indicate identical parts.

In general the apparatus comprises two revolving tables 8 and 9 adjacently adjustable to each other and one above the other, and which may be revolved at the same or different speeds; in the same or different directions. The pulverizing rings 10, 11, each with a substantially triangular cross section are removable and independently of each other adjustable, so that any desired size of coal may be pulverized to pass any desired mesh between the coacting faces 4—4', 5—5', 6—6', 7—7'. The pairs of rings 10—11, 10'—11', 10"—11", are adjusted by means of bolts 24—25 attaching the rings to revolving plates 8—9. Oil heated if desired, from a source 17 is conducted by pressure means 16 through pipes 14 and closable valves 13 and orifices 12, through the plates and rings to the faces of the rings. A similar arrangement (not shown) conducts the fixing agent or the fixing agent in some cases is conducted with the liquid hydrocarbon. The table 9 is supported on a revolving shaft 23 and by exterior legs 20, to which are attached wheels 21, which run on track 22. Similar revolving means (not shown) are attached to the lower table 8. A peripheral guard 19 is attached about the outer edge of upper table 9. A trough 18 receives the mixed colloidal fuel and may contain mechanical conducting means 26. The ribs may be provided with heating means 27 if desired. The rim 19, may be perforated, (see Fig. 3) and a second rim 19' spaced without the rim 19 to collect excess liquid centrifugally driven through the rim 19. By this means it is possible to use an excess of liquid during grinding and remove the excess in a continuous operation.

The track 22 may be closed (see Fig. 4) and formed to guide the wheel 21 in other than a horizontal plane which will cause the table to wobble while revolving and bring the parallel grinding faces nearer together and farther apart as predetermined by the vertical trace of the track.

Briefly, the operation is as follows, using for example, a No. 4 buckwheat coal as the carboniferous substance to be pulverized and mixed to form a colloidal fuel. The coal is fed by suitable means adjacent the center of the rapidly revolving table as indicated by arrow 1. When the coal stream reaches the position indicated by arrow 2 it is spread out toward and up along the face 4 of the pulverizing ring 10 by centrifugal force. The coal is spread in a thin layer by the rapid revolution of the circular table. As the coal travels upward, the oversize particles gradually approach the upper revolving table 9 and are further reduced by contact with and between faces 4 and 4' of pulverizing rings 10 and 11 until at the position 5—5' which is set for example at size 50 mesh, the coal is all now 50 mesh or smaller.

From orifice 12 extending through the upper table a fine stream of the liquid hydrocarbon mixed with the fixing agent (if one be necessary) is sprayed and as the coal particles travel upward each particle of coal encounters and is rolled about in this thin stream of liquid. This operation is repeated as the coal passes upward and downward on each rib or pulverizing face. The quantity of liquid allowed to come in contact with the coal can be accurately regulated so that the colloidal fuel produced will have exactly the amount intended and required.

As shown in Fig. 1, the first pulverizing action and mixing with liquid reduces all the coal to 50 mesh or smaller particles; the second pulverizing ring 10'—11' has the faces set at 100 mesh and the coal is reduced to 100 mesh or smaller while an additional amount of liquid as required is sprayed on the particles; the third pulverizing ring has the faces set at 150 mesh and the coal particles are again reduced to 150 or smaller and a corresponding amount of liquid added to the mixture. This concurrent succession of reduction and spraying actions insures that at the end of the operation each particle of pulverized fuel is covered and completely surrounded by a film of the liquid.

One of the reasons for adding liquid at each step of reduction is the fact that the material pulverized to pass each screen contains many smaller particles, as previously stated in this specification, and it is therefore essential in order to form a stable colloidal mixture that additional liquid be added to form a film on the new fractures occurring as each larger particle is further disintegrated into several particles as the surface area of a given number of small particles is greater than that of the one larger particle of which the smaller particles were composed.

Having thus particularly described the invention, what is claimed is:

1. In apparatus of the character described, in combination, means for pulverizing carbonaceous substances by continuous and successive steps, and means for supplying material to the first mentioned means during all of said steps for coating the pulverized particles with a film.

2. In apparatus of the character described, in combination, means for pulverizing carbonaceous substances by continuous and successive steps, and regulatable means for supplying material to the first mentioned means during all of said steps for coating the pulverized particles with a film.

3. In apparatus of the character described, in combination, means for pulverizing carbonaceous substances by continuous and successive steps, and means for supplying to the first mentioned means during each of said steps material for coating the pulverized particles with a liquid film.

4. In apparatus of the character described, in combination, means for pulverizing carbonaceous substances by continuous and successive steps, and regulatable means for supplying to the first mentioned means during each of said steps material for coating the pulverized particles with a liquid film.

5. In apparatus of the character described, in combination, means including coacting inclined grinding planes for pulverizing carbonaceous materials by successive steps and means for supplying to said planes material for coating the pulverized particles with a film during operation of the first mentioned means.

6. In apparatus of the character described, in combination, means including coacting inclined grinding planes for pulverizing carbonaceous substances by continuous and succesive steps, and means for supplying to said planes during each of said steps material for coating the pulverized particles with a film.

7. In apparatus of the character described, in combination, means including coacting downwardly faced inclined planes and upwardly faced inclined planes for pulverizing carbonaceous substances by successive steps, and means for supplying to the upwardly faced inclined planes material for coating the pulverized particles with a film during operation of the first mentioned means.

8. In apparatus of the character described, in combination, means including coating downwardly faced inclined planes and upwardly faced inclined planes for pulverizing carbonaceous substances by continuous and successive steps, and means for supplying to the upwardly faced inclined planes during each of said steps material for coating the pulverized particles with a film.

9. In apparatus of the character described, means including coacting inclined planes for pulverizing carbonaceous substances therebetween by successive steps, the coacting inclined planes being arranged to provide space therebetween whereby the carbonaceous substances are pulverized to a smaller mesh at each successive step, and means for supplying material to said planes for coating the pulverized particles with a film during said steps.

10. In apparatus of the character described, means including coacting disks having downwardly faced inclined planes and upwardly faced inclined planes for pulverizing carbonaceous substances therebetween by successive steps, the coacting disks being arranged to provide space between the inclined planes whereby the carbonaceous substances are pulverized to a smaller mesh at each successive step, and means for supplying material to said planes for coating the pulverized particles with a film during said steps.

11. In apparatus of the character described, in combination, means including coacting inclined planes for pulverizing carbonaceous substances therebetween by continuous and successive steps, the coacting inclined planes being arranged to provide space therebetween whereby the carbonaceous substances are pulverized to a smaller mesh at each successive step, and means for supplying during each of said steps material for coating the pulverized particles with a film.

12. In apparatus of the character described, in combination, means including coacting disks having downwardly faced inclined planes and upwardly faced inclined planes for pulverizing carbonaceous substances therebetween by continuous and succesive steps, said inclined planes being arranged to provide space therebetween whereby the carbonaceous substances are pulverized to a smaller mesh at each successive step, and means for supplying during each of said steps material for coating the pulverized particles with a film.

13. In apparatus of the character described, in combination, means including coacting rotary disks having planes for pulverizing carbonaceous substances therebetween, means for supplying to the first mentioned means by movement counter to gravity carbonaceous substances, the substances so supplied being centrifugally moved between said planes for pulverization, and means for supplying to the first mentioned means material for coating the pulverized particles with a film during pulverization of the substances.

14. In apparatus of the character described, in combination, means including coacting rotary disks having inclined planes for pulverizing carbonaceous substances therebetween by continuous and successive steps, means for supplying to the first mentioned means carbonaceous substances by movement of said substances counter to gravity, the substances so supplied being centrifugally moved between said planes for pulverization, and means for supplying to the first mentioned means during each of said steps material for coating the pulverized particles with a film.

15. In apparatus of the character described, in combination, means including coacting rotary disks having downwardly faced inclined planes and upwardly faced inclined planes for pulverizing carbonaceous substances therebetween, means for supplying to the first mentioned means carbonaceous substances by upward movement of said substances, the substances so supplied being centrifugally moved between said planes for pulverization, and means for supplying to said upwardly faced inclined planes during pulverization of said substances liquid for coating the pulverized particles with a film.

16. In apparatus of the character described, rotary tables having a succession of pairs of concentric ribs thereon, the ribs on one table spaced between the adjacent ribs on the other table to form pairs of opposed grinding faces, said pairs of faces spaced apart in successive decreasing distances, said ribs having orifices therethrough for permitting flow of liquid onto said faces.

17. In apparatus of the character described, rotary tables having ribs thereon providing grinding faces, and means within said ribs adjacent the faces thereof whereby to conduct heat from said faces to material pulverized and mixed between said faces.

18. In apparatus of the character described, a first rotary table, a second table rotatable in a plane parallel to the plane of rotation of the first table, means for grinding coacting between the faces of said tables, said grinding means consisting of sets of steeply inclined coacting grinding faces and coacting grinding faces of long inclines disposed adjacently to the steeply inclined faces, the spaces between the coacting grinding faces of long inclines constituting passages for material from one set of steeply inclined grinding faces to the next set, means for conveying liquid to the spaces between the coacting steeply inclined grinding faces, and means for conveying liquid to the spaces between the coacting grinding faces of long inclines.

19. In apparatus of the character described, a first rotary table, a second table rotatable in a plane parallel to the plane of rotation of the first table, means for grinding coacting between the faces of said tables, said grinding means consisting of sets of steeply inclined coacting grinding faces and coacting grinding faces of long inclines disposed adjacently to the steeply inclined faces, the spaces between the coacting grinding faces of long inclines constituting passages for material from one set of steeply inclined grinding faces to the next set, the spaces between the coacting faces of each set of steeply inclined grinding faces and between the coacting faces of the adjacent grinding faces of long inclines being constricted relative to said spaces of the next preceding set for providing ground material of smaller mesh than that provided by the preceding set, means for conveying liquid to the spaces between the coacting steeply inclined grinding faces, and means for conveying liquid to the spaces between the coacting grinding faces of long inclines.

20. In apparatus of the character described, in combination, means for pulverizing carbonaceous substances by continuous and successive steps, means for supplying liquid to the first mentioned means during all of said steps for coating the pulverized particles with a film, inner perforate means disposed around the first mentioned means and spaced away therefrom, and outer imperforate means disposed around said inner means and spaced away therefrom and cooperating therewith for permitting use of excess of said liquid and removing said excess during pulverizing.

21. In apparatus of the character described, in combination, means including coacting rotary disks having inclined planes for pulverizing carbonaceous substances therebetween, means for supplying to the first mentioned means carbonaceous substances by movement of said substances counter to gravity, the substances so supplied being centrifugally moved between said planes for pulverization, means for supplying to the inclined planes liquid for coating the pulverized particles with a film during pulverization of the substances, an inner perforate rim disposed around the outer edges of said disks at the ends of the inclined planes and spaced away therefrom, and an outer imperforate rim disposed around said inner rim and spaced away therefrom and cooperating therewith for collecting excess of said liquid centrifugally driven through the inner rim and permitting use of excess of said liquid and removing said excess during pulverizing.

22. In apparatus of the character described, in combination, means for pulverizing carbonaceous substances by successive steps, means for supplying to the first mentioned means material for coating the pulverized particles with a film, and means for heating the first mentioned means during operation thereof.

23. In apparatus of the character described, in combination, means for pulverizing carbonaceous substances by continuous and successive steps, means for supplying to the first mentioned means during all of said steps material for coating the pulverized particles with a film, and means for heating the first mentioned means during operation thereof.

24. In apparatus of the character described, in combination, means including co-acting inclined planes for pulverizing carbonaceous substances therebetween by continuous and successive steps, and means for heating the inclined planes during operation of the first mentioned means.

25. In apparatus of the character described, in combination, means including co-acting inclined planes for pulverizing carbonaceous substances therebetween by successive steps, means for supplying to said planes during operation of the first mentioned means material for coating the pulverized particles with a film, and means for heating the inclined planes during operation of the first mentioned means.

26. In apparatus of the character described, in combination, means including co-acting downwardly faced inclined planes and upwardly faced inclined planes for pulverizing carbonaceous substances therebetween by successive steps, means for supplying to the upwardly faced inclined planes material for coating the pulverized particles with a film during operation of the first mentioned means, and means for heating the inclined planes during operation of the first mentioned means.

27. In an apparatus of the class described, in combination, means for pulverizing substances by successive steps and means for supplying material to said first mentioned means for coating the pulverized particles with a film.

28. In an apparatus of the class described, in combination, means for pulverizing carbonaceous substances by successive steps, and means for supplying material to said first mentioned means during said steps for coating the pulverized particles with a film.

29. In combination, means for subdividing substances by successive steps, and means for supplying material to the aforesaid means during said steps for coating the subdivided particles with a film.

30. In combination, means for pulverizing carbonaceous substances by successive steps and means associated with said means for heating said substance during pulverization.

Signed at 934 Park Ave., Plainfield, in the county of Plainfield, and State of New Jersey, this 4th day of March, A. D. 1925.

HENRY ADAMS.